US012625574B2

(12) United States Patent
Huang et al.

(10) Patent No.: US 12,625,574 B2
(45) Date of Patent: May 12, 2026

(54) PROTECTIVE COVER FOR CONTROL STICK AND REMOTE CONTROLLER

(71) Applicant: AUTEL ROBOTICS CO., LTD., Shenzhen (CN)

(72) Inventors: Chang Huang, Shenzhen (CN); Yunlong Luo, Shenzhen (CN); Jianlei Wang, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 115 days.

(21) Appl. No.: 18/380,638

(22) Filed: Oct. 16, 2023

(65) Prior Publication Data

US 2024/0045525 A1 Feb. 8, 2024

Related U.S. Application Data

(63) Continuation-in-part of application No. PCT/CN2022/084129, filed on Mar. 30, 2022.

(30) Foreign Application Priority Data

Apr. 16, 2021 (CN) .......................... 202110414065.0

(51) Int. Cl.
*G06F 3/039* (2013.01)
*G05G 9/047* (2006.01)

(52) U.S. Cl.
CPC ............. *G06F 3/039* (2013.01); *G05G 9/047* (2013.01)

(58) Field of Classification Search
CPC ........ G06F 3/039; G06F 3/0338; G06F 3/038; G05G 9/047; A63F 13/24
See application file for complete search history.

(56) References Cited

U.S. PATENT DOCUMENTS 5,831,554 A 11/1998 Hedayat et al.
5,974,909 A 11/1999 Bauer et al.
(Continued)

FOREIGN PATENT DOCUMENTS

CN 1339737 A 3/2002
CN 206045411 U 3/2017
(Continued)

OTHER PUBLICATIONS

The State Intellectual Property Office of People's Republic of China, "The First Office Action" issued in Application No. 202110414065.0 dated Dec. 27, 2024, (11p).
(Continued)

*Primary Examiner* — Michael A Faragalla
(74) *Attorney, Agent, or Firm* — Arch & Lake LLP

(57) ABSTRACT

The present disclosure relates to the field of remote controller technologies and discloses a protective cover for a control stick and a remote controller. The control stick protective cover includes: a first elastic member, where a first accommodation groove is provided in a middle of the first elastic member, and the first accommodation groove is configured to mount the control stick; a second elastic member, arranged around the first elastic member, where the second elastic member is fixed to a panel of the remote controller; and a buffer member, connected between the first elastic member and the second elastic member, where the buffer member is provided with a bent portion.

20 Claims, 4 Drawing Sheets

(56)     References Cited

U.S. PATENT DOCUMENTS

| 10,073,488 | B2 | 9/2018 | Conro et al. | |
| 2017/0304717 | A1* | 10/2017 | Huang | ................. G06F 3/0338 |
| 2021/0011469 | A1* | 1/2021 | Chen | .................... G05D 1/0016 |

FOREIGN PATENT DOCUMENTS

| CN | 206098255 | U | 4/2017 |
| CN | 207557694 | U | 6/2018 |
| CN | 207764655 | U | 8/2018 |
| CN | 109891468 | A | 6/2019 |
| CN | 211752429 | U | 10/2020 |
| CN | 212569576 | U | 2/2021 |
| JP | 2003346608 | A | 12/2003 |
| WO | 2019041837 | A1 | 3/2019 |

OTHER PUBLICATIONS

The Extended European Search Report issued in Application No. 22787384.1 dated Sep. 4, 2024, (10p).
The International Search Report issued in Application No. PCT/CN2022/084129 with dated Mar. 1, 2021, with English translation,(7p).

* cited by examiner

100

100

40

PROTECTIVE COVER FOR CONTROL STICK AND REMOTE CONTROLLER

CROSS-REFERENCE TO RELATED APPLICATIONS

The present application is a Continuation Application of International Application No. PCT/CN2022/084129, filed on Mar. 30, 2022, which claims benefit of priority to Chinese Patent Application No. 2021104140650, filed to the Chinese Patent Office on Apr. 16, 2021, the entire of contents of which are incorporated herein by reference.

BACKGROUND

An unmanned aerial vehicle (UAV) is an unmanned aircraft operated by a radio remote control device and a self-built program control apparatus. With the development of science and technology, unmanned aerial vehicles have been more widely used in the fields such as industry, commerce, and daily life, and their functions have also become stronger. A remote controller used for controlling the unmanned aerial vehicle, as an important device for controlling the flight status of the unmanned aerial vehicle, has also been constantly improved.

A control stick is one of movable parts of the remote controller, and there are also certain requirements for the design of a protective cover used for mounting the control stick. During implementation of the present disclosure, the applicant has discovered that a protective cover in an existing solution has a complex structural design, leading to poor manufacturability and failing to meet the requirements of industrial production.

Therefore, it is necessary to provide a protective cover for a control stick to resolve the foregoing defects.

SUMMARY

The present disclosure relates to the field of flipping technologies, and in particular, to a protective cover for a control stick.

Embodiments of the present disclosure aim to provide a protective cover for a control stick and a remote controller to resolve the technical problems of complex structure and poor manufacturability.

The first aspect of the present disclosure adopts the following technical solution to resolve the technical problems. The present disclosure provides a protective cover for a control stick, including: a first elastic member, where a first accommodation groove is provided in a middle of the first elastic member, and the first accommodation groove is configured to mount the control stick;

a second elastic member, arranged around the first elastic member, where the second elastic member is fixed to a panel of the remote controller; and a buffer member, connected between the first elastic member and the second elastic member, where the buffer member includes a bent portion.

The second aspect of the present disclosure further provides a remote controller, including:

a housing;

an antenna assembly, accommodated in the housing, where the antenna assembly is communicatively connected to an unmanned aerial vehicle;

a main control board, accommodated in the housing, where the main control board is connected to the antenna assembly;

the protective cover for a control stick described above, where the protective cover for a control stick is fixed to the housing and partially protrudes from the housing; and a control stick, fixed to the first accommodation groove, where the control stick is connected to the main control board.

The third aspect of the present disclosure provides a remote controller according to the second aspect or any embodiment of the second aspect, further including a display screen, where the display screen is connected to the antenna assembly

BRIEF DESCRIPTION OF THE DRAWINGS

One or more embodiments are described by way of example with reference to the corresponding figures in the accompanying drawings, and the exemplary descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding of the present disclosure, the present disclosure is described below in more detail with reference to accompanying drawings and specific implementations. It should be noted that, when a component is expressed as "being fixed to" another component, the component may be directly on the another component, or one or more intermediate components may exist between the component and the another component. When a component is expressed as "being connected to" another component, the component may be directly connected to the another component, or one or more intermediate components may exist between the component and the another component. The terms "front", "rear", "left", and "right", and similar expressions used in this specification are merely used for an illustrative purpose.

Unless otherwise defined, meanings of all technical and scientific terms used herein are the same as meanings generally understood by a person skilled in the technical field to which the present disclosure belongs. In this specification, terms used in the specification of the present disclosure are merely intended to describe objectives of the specific embodiments, but are not intended to limit the present disclosure. A term "and/or" used in this specification includes any or all combinations of one or more related listed items.

Figure 1:
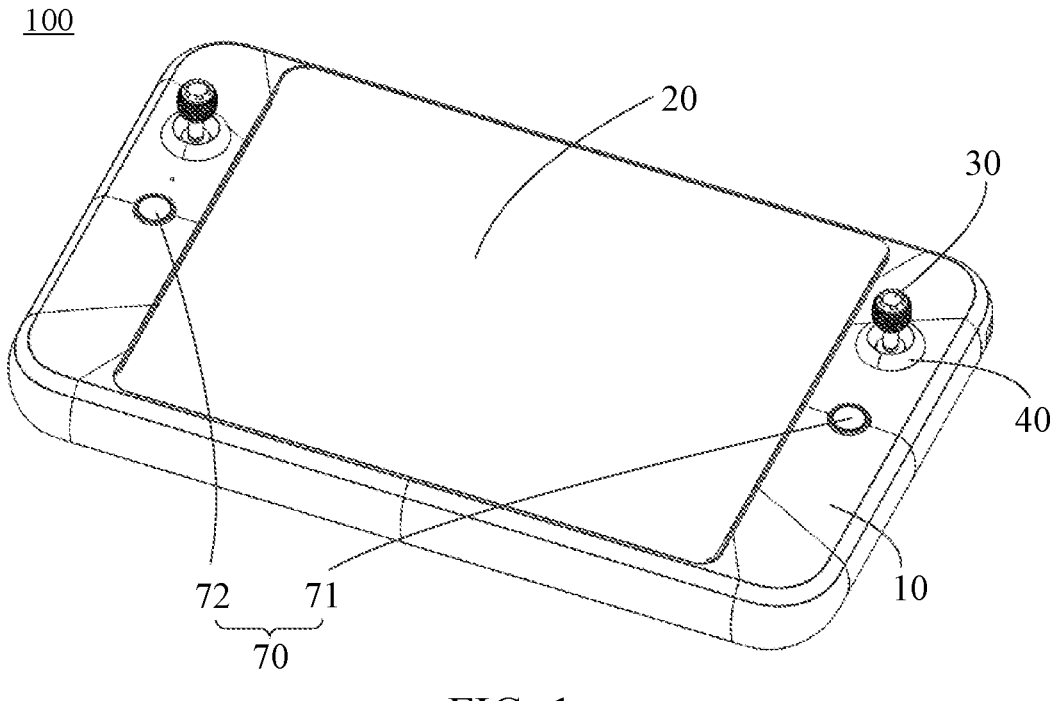
FIG. 1 is a schematic structural diagram of a remote controller according to an embodiment of the present disclosure.
Figure 2:
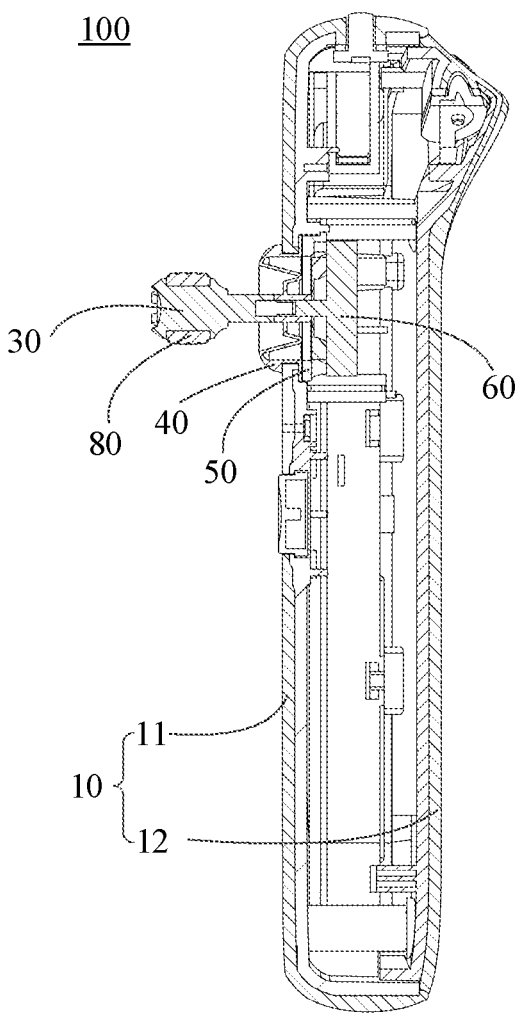
FIG. 2 is a cross-sectional view of the remote controller shown in FIG. 1.

FIG. 1 is a schematic structural diagram of a remote controller 100 according to an embodiment of the present disclosure. The remote controller 100 is configured to control an unmanned aerial vehicle aircraft.

The remote controller 100 includes a housing 10, a display screen 20, and a main control board mounted in the housing. An antenna assembly for receiving and transmitting a signal is further mounted on the housing 10, and the antenna assembly is connected to the main control board. The display screen 20 is mounted on the housing 10. The display screen 20 is connected to the antenna assembly and is configured to display an image captured by a camera on the unmanned aerial vehicle aircraft.

The housing 10 includes a panel 11 and a bottom plate 12, where the bottom plate 12 is fastened to the panel 11. Both the main control board and the antenna assembly are located in a cavity enclosed by the panel 11 and the bottom plate 12, and the display screen 20 is mounted on the panel 11.

The housing 10 is also provided with two sets of control assemblies, namely a first control assembly and a second control assembly. The first control assembly is configured to enable the unmanned aerial vehicle aircraft to perform a first operation, and the second control assembly is configured to enable the unmanned aerial vehicle aircraft to perform a second operation.

It should be noted that, the first operation refers to enabling the unmanned aerial vehicle aircraft to move back and forth, and the second operation refers to enabling the unmanned aerial vehicle aircraft to accelerate or decelerate or rotate clockwise or counterclockwise.

In some embodiments, structures of the first control assembly and the second control assembly are the same.

In this specification, a first control assembly is used as an example for description. The first control assembly includes a control stick 30 and a protective cover for a control stick 40. The control stick 30 is mounted on the panel 11 through the protective cover for a control stick 40. The control stick 30 is configured to adjust the attitude and the lifting and descent of the unmanned aerial vehicle aircraft. For example, the control stick 30 is moved forward to control a lift of the unmanned aerial vehicle aircraft, the control stick 30 is moved backward to control a descent of the unmanned aerial vehicle aircraft, the control stick 30 is moved to the left to adjust the unmanned aerial vehicle aircraft forward and is moved to right to adjust the unmanned aerial vehicle aircraft rightward.

Figure 3:
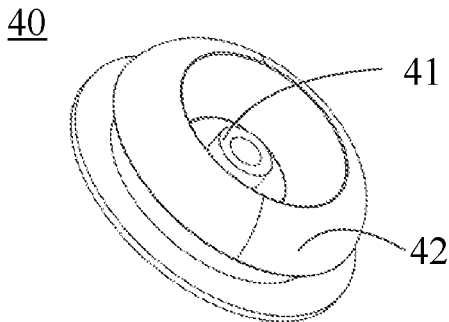
FIG. 3 is a schematic structural diagram of a protective cover for a control stick in the remote controller shown in FIG. 1.
Figure 4:
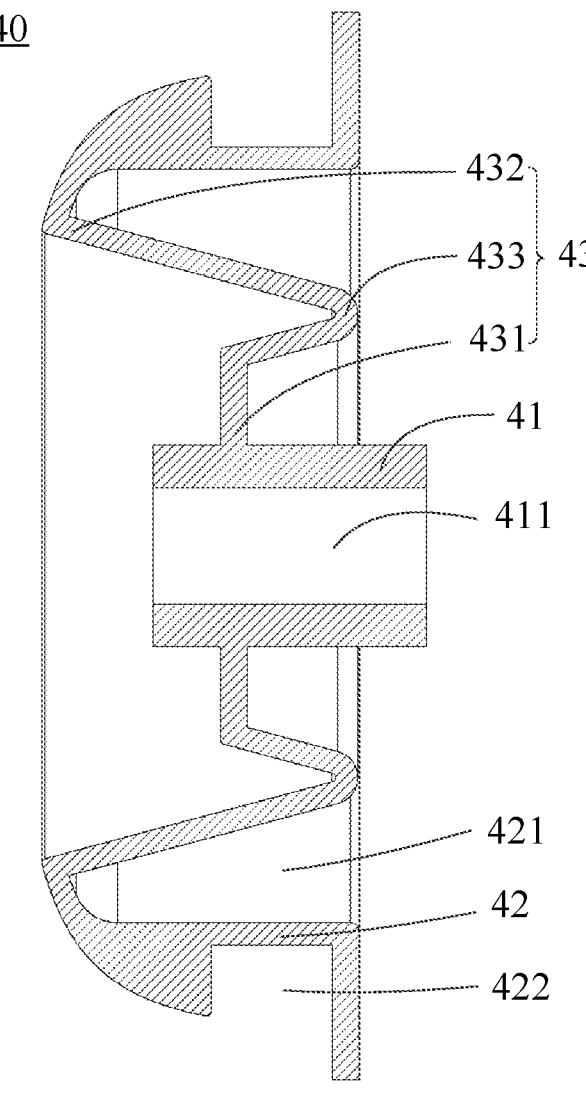
FIG. 4 is a cross-sectional view of the protective cover for a control stick shown in FIG. 3.

Refer to FIG. 3 and FIG. 4 together. The protective cover for a control stick 40 includes a first elastic member 41, a second elastic member 42, and a buffer member 43. A first accommodation groove 411 is provided in the middle of the first elastic member 41, where the first accommodation groove 411 is configured to mount the control stick 30. The control stick 30 is in an interference fit with the first accommodation groove 411, the second elastic member 42 is arranged around the first elastic member 41, and the second elastic member 42 is fixed to the panel 11. A second accommodation groove 421 is provided in the middle of the second elastic member 42, where the second accommodation groove 421 is connected to the first accommodation groove 411. The buffer member 43 is arranged in the second accommodation groove 421, the buffer member 43 is connected between the first elastic member 41 and the second elastic member 42, and the buffer member 43 is configured to enable the control stick 30 to swing in the second accommodation cavity 421. In addition, when the control stick 30 swings, the buffer member 43 may further reduce the shaking of the second elastic member 42 and prevent the second elastic member 42 from deviating relative to the housing 10, thus increasing a protection level of the remote controller 100.

In some embodiments, the first elastic member 41 and the second elastic member 42 are coaxially arranged to facilitate an operation of the control stick, so that a movement stroke of the control stick 30 in a circumferential direction is the same.

The circumferential direction is a direction surrounding the first elastic member.

In some embodiments, one end of the first elastic member 41 is located in the second accommodation groove 421, and the other end of the first elastic member 41 protrudes from the second accommodation groove 421.

It may be understood that in another embodiment, the first elastic member 41 may also be completely arranged outside the second accommodation groove 421.

In some embodiments, the first elastic member 41 is straight-cylindrical when not affected by external force, and one end of the control stick 30 connected to the first elastic member 41 is also straight-cylindrical, so that the control stick 30 is easily controlled when swinging under force, and the remote control stick 30 does not cause the control stick to swing greatly due to accidentally touching the control stick 30 and affect the unmanned aerial vehicle aircraft.

In some embodiments, the second elastic member partially protrudes from the panel 11. Specifically, an outer surface of the second elastic member 42 is provided with a recess 422, and the protective cover for a control stick 40 is clamped and fixed to the panel 11 through the recess 422 to prevent dust and water vapor from entering an interior of the housing and damaging the remote controller 100.

In some embodiments, a first end 431 of the buffer member is connected to the first elastic member 41, and a second end 432 of the buffer member is connected to the second elastic member 42. The buffer member further includes a bent portion 433, and the bent portion 433 is located between the first end 431 of the buffer member and the second end 432 of the buffer member.

A direction in which the first elastic member 41 protrudes relative to the second accommodation groove 421 is a direction of the bottom of the second accommodation groove 421, and a direction opposite to the bottom is a top direction.

In some embodiments, to increase a swing stroke of the control stick 30, the bent portion 433 is located at the bottom of the second accommodation groove 421.

Preferably, the bent portion 433 is located in the middle of the first elastic member 41 and the second elastic member 42.

In some embodiments, to increase a swing stroke of the control stick 30, the second end 432 of the buffer member is connected to the top of the second accommodation groove 421.

It should be noted that, when the first end 431 of the buffer member, the bent portion 433, and the second end 432 of the buffer member are located on a same plane, the control stick 30 has a maximum swing stroke. The larger the swing stroke of the control stick 30 is, the larger the operable range of the unmanned aerial vehicle aircraft is.

In some embodiments, the first elastic member 41, the second elastic member 42, and the buffer member 43 are integrally formed.

Figure 5:
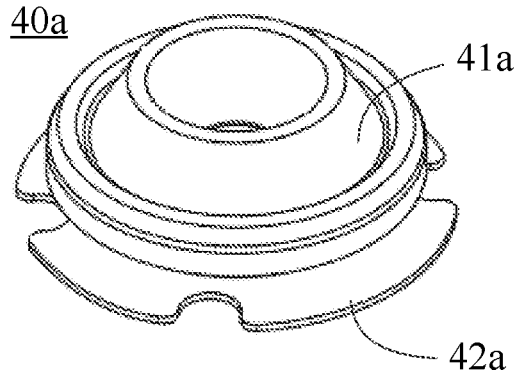
FIG. 5 is a schematic structural diagram of a design of a protective cover for a control stick in the prior art.
Figure 6:
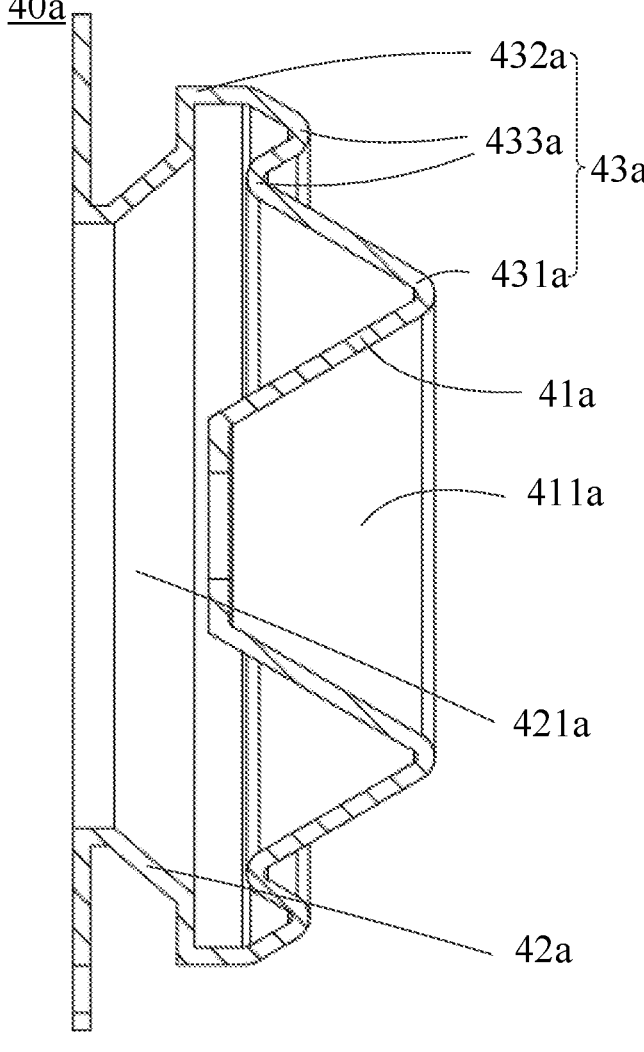
FIG. 6 is a cross-sectional view of the protective cover for a control stick shown in FIG. 5.

Refer to FIG. 5 and FIG. 6 together, which shows a protective cover for a control stick in the prior art. The protective cover for a control stick 40a includes a first elastic member 41a, a second elastic member 42a, and a buffer member 43a. A first end 431a of the buffer member is connected to the first elastic member 41a, and a second end 432a of the buffer member is connected to the second elastic member 42a. A first accommodation cavity 411a is provided in the middle of the first elastic member 41a, and a second accommodation cavity 421a is provided in the middle of the second elastic member 42a. Different from the protective cover for a control stick 40a, the buffer member 43a is provided with a plurality of bent portions 433a, and the arrangement of the plurality of bent portions 433a increases an overall height of the protective cover for a control stick 40a. Therefore, after the protective cover for a control stick 40a is engaged with the panel 11, a larger part of the protective cover for a control stick 40a protrudes from the panel.

In addition, the first elastic member 41a is in a shape of lug boss when not affected by external force. When a connecting end of the control stick 30 and the first elastic member 41a is straight-cylindrical, the control stick 30 is less hindered when swinging in the first accommodation cavity 411a, so that the sensitivity of the control stick 30 is relatively high, and when the control stick is accidentally touched, the control stick is easily out of control.

Compared with the prior art, the protective cover for a control stick 40 in this application enables the control stick to be controlled easily. In addition, in the embodiments of this application, because the buffer member 43 is designed with only one bent portion, compared with the prior art, the manufacturability of the protective cover for a control stick 40 is improved, and the design complexity of the protective cover for a control stick 40 is reduced at the same time.

In addition, due to the reduction of the bent portion, the overall height of the protective cover for a control stick 40 is reduced, so that a height of the protective cover for a control stick 40 protruding from the panel 11 is reduced, thus making the remote controller 100 more beautiful.

In some embodiments, the protective cover for a control stick 40 is made of silica gel. In another embodiment, the protective cover for a control stick 40 is any elastic member having an elastic function, as long as the elastic member has good restoring force after elastic deformation, that is, the elastic member may be restored to an original state in a relatively short period of time after elastic deformation.

The protective cover for a control stick 40 is fixed to the panel 11 of the housing 10. Specifically, an adhesive material may be coated in the recess 422, and after the recess 422 is engaged with the panel 11, the protective cover for a control stick 40 may be fixed to the panel 11 through the adhesive material.

In some embodiments, the protective cover for a control stick 40 may be fixed to the housing 10 in another manner. For example, the first control assembly includes a pressing plate 50, and the protective cover for a control stick 40 is fixed to the panel 11 of the housing 10 through the pressing plate 50. Specifically, the pressing plate 50 is arranged around the first elastic member 41. A first positioning hole is provided in the middle of the pressing plate 50. One end of the first elastic member 41 protruding from the second accommodation groove 421 is arranged in the first positioning hole, and the pressing plate 50 abuts against the second elastic member 42.

The pressing plate 50 is provided with a mounting hole that is in a circumferential array, and the mounting hole is arranged around the positioning hole. The panel 11 is provided with a positioning post corresponding to a position of the mounting hole, and a second positioning hole is provided on the positioning post. After a screw passes through the mounting hole and the second positioning hole in sequence, the pressing plate 50 and the protective cover for a control stick 40 are fixed to the panel 11.

In some embodiments, the first control assembly further includes a potentiometer 60, the control stick 30 is connected to the potentiometer 60, the potentiometer 60 is connected to the main control board, the potentiometer is fixed on the panel 11, and the potentiometer 60 is driven to swing by the swing of the control stick 30.

The control stick 30 is connected to the potentiometer 60. Specifically, the control stick 30 is provided with a threaded hole, and a shaft of the potentiometer 60 is screwed to the threaded hole. Alternatively, the control stick 30 is provided with a hole, and the hole of the control stick 30 is an interference fit with the shaft of the potentiometer 60. Alternatively, the control stick 30 and the shaft of the potentiometer 60 are fixedly connected through the adhesive material.

Alternatively, a second accommodation groove is provided in a middle of the second elastic member, the second accommodation groove is in communication with the first accommodation groove, and the buffer member is arranged in the second accommodation groove.

Alternatively, one end of the first elastic member is located in the second accommodation groove, and another end of the first elastic member protrudes from the second accommodation groove.

Alternatively, in a protruding direction of the first elastic member, the bent portion is located at a bottom of the second accommodation groove.

Alternatively, in a protruding direction of the first elastic member, the buffer member is connected to a top of the second accommodation groove.

Alternatively, the first elastic member and the second elastic member are coaxially arranged.

Alternatively, an outer surface of the second elastic member is provided with a recess, and the recess is engaged with a panel of a housing of the remote controller.

Alternatively, the first elastic member, the second elastic member, and the buffer member are integrally formed.

Alternatively, the protective cover for a control stick is made of silica gel.

It should be noted that, the potentiometer 60 has a multi-directional switch and can swing in a plurality of directions around.

It may be understood that the control stick of the second control assembly is configured to adjust a second operation of the unmanned aerial vehicle aircraft. For example, when it is turned to the right, the unmanned aerial vehicle aircraft rotates clockwise, and when it is turned to the left, the unmanned aerial vehicle aircraft rotates counterclockwise.

In some embodiments, a key switch 70 is further provided on the panel 11, and the key switch 70 is connected to the antenna assembly. The key switch 70 includes a first key switch 71 and a second key switch 72. The first key switch 71 is configured to enable the unmanned aerial vehicle aircraft return immediately, and the second key switch 72 is configured to enable the unmanned aerial vehicle aircraft hover.

In some embodiments, to facilitate an operation of the control stick 30 and avoid slipping when grasping the control stick 30, a slip-proof sleeve 80 is mounted on the control stick 30.

In some embodiments, the remote controller further includes a display screen, and the display screen is connected to the antenna assembly.

Compared with the prior art, the present disclosure provides a protective cover for a control stick and a remote controller. The bent portion is arranged on the buffer member, so that manufacturability of the protective cover for a control stick is improved and design complexity of the protective cover for a control stick is reduced.

In addition, due to the reduction of the bent portion, an overall height of the protective cover for a control stick is reduced, so that a height of the protective cover for a control stick protruding from the panel is reduced, thus making the remote controller more beautiful.

It should be noted that, the specification of the present disclosure and the accompanying drawings thereof illustrate preferred embodiments of the present disclosure. However, the present disclosure may be implemented in various different forms, and is not limited to the embodiments described in this specification. These embodiments are not intended to be an additional limitation on the content of the present disclosure, and are described for the purpose of providing a more thorough and comprehensive understanding of the content disclosed in the present disclosure. In addition, if the above technical features continue to be combined with each other to form various embodiments not listed above, and all such embodiments shall be construed as falling within the scope of the specification of the present disclosure. Further, a person of ordinary skill in the art may make improvements or variations according to the above descriptions, and such improvements and variations shall all fall within the protection scope of the appended claims of this application.

What is claimed is:

1. A protective cover for a control stick, applied to a remote controller, and comprising:
    a first elastic member, wherein a first accommodation groove is provided in a middle of the first elastic member, and the first accommodation groove is configured to mount the control stick;
    a second elastic member, arranged around the first elastic member, wherein the second elastic member is fixed to a panel of the remote controller, and a second accommodation groove is provided in a middle of the second elastic member; and
    a buffer member arranged in the second accommodation groove, wherein the buffer member comprises a first end, a second end and a bent portion located between the first end and the second end, wherein the first end of the buffer member is connected to the first elastic member, and the second end of the buffer member is connected to the second elastic member, and the buffer member is configured to allow the control stick to swing in the second accommodation groove.

2. The protective cover for the control stick according to claim 1, wherein
    the second accommodation groove is in communication with the first accommodation groove.

3. The protective cover for the control stick according to claim 2, wherein
    a first end of the first elastic member is located in the second accommodation groove, and a second end of the first elastic member protrudes from the second accommodation groove.

4. The protective cover for the control stick according to claim 3, wherein
    in a protruding direction of the first elastic member, the bent portion is located at a bottom of the second accommodation groove.

5. The protective cover for the control stick according to claim 3, wherein
    in a protruding direction of the first elastic member, the buffer member is connected to a top of the second accommodation groove.

6. The protective cover for the control stick according to claim 1, wherein
    the first elastic member and the second elastic member are coaxially arranged.

7. The protective cover for the control stick according to claim 1, wherein
    an outer surface of the second elastic member is provided with a recess, and the recess is engaged with a panel of a housing of the remote controller.

8. The protective cover for the control stick according to claim 1, wherein
    the first elastic member, the second elastic member, and the buffer member are integrally formed.

9. The protective cover for the control stick according to claim 1, wherein
    the protective cover for the control stick is made of silica gel.

10. A remote controller, comprising:
    a housing;
    an antenna assembly, accommodated in the housing, wherein the antenna assembly is communicatively connected to an unmanned aerial vehicle;
    a main control board, accommodated in the housing, wherein the main control board is connected to the antenna assembly;
    a protective cover for a control stick, wherein the protective cover for the control stick is fixed to the housing and partially protrudes from the housing, and comprising:
    a first elastic member, wherein a first accommodation groove is provided in a middle of the first elastic member, and the first accommodation groove is configured to mount the control stick;
    a second elastic member, arranged around the first elastic member, wherein the second elastic member is fixed to a panel of the remote controller, and a second accommodation groove is provided in a middle of the second elastic member; and
    a buffer member arranged in the second accommodation groove, wherein the buffer member comprises a first end, a second end and a bent portion located between the first end and the second end, wherein the first end of the buffer member is connected to the first elastic member, and the second end of the buffer member is connected to the second elastic member, and the buffer member is configured to allow the control stick to swing in the second accommodation groove; and
    the control stick, fixed to the first accommodation groove, wherein the control stick is connected to the main control board.

11. The remote controller according to claim 10, wherein the second accommodation groove is in communication with the first accommodation groove.

12. The remote controller according to claim 11, wherein
    a first end of the first elastic member is located in the second accommodation groove, and a second end of the first elastic member protrudes from the second accommodation groove.

13. The remote controller according to claim 12, wherein
    in a protruding direction of the first elastic member, the bent portion is located at a bottom of the second accommodation groove.

14. The remote controller according to claim 12, wherein in a protruding direction of the first elastic member, the buffer member is connected to a top of the second accommodation groove.

15. The remote controller according to claim 10, wherein the first elastic member and the second elastic member are coaxially arranged.

16. The remote controller according to claim 10, wherein an outer surface of the second elastic member is provided with a recess, and the recess is engaged with a panel of a housing of the remote controller.

17. The remote controller according to claim 10, wherein the first elastic member, the second elastic member, and the buffer member are integrally formed.

18. The remote controller according to claim 10, wherein the protective cover for the control stick is made of silica gel.

19. The remote controller according to claim 10, further comprising:

a display screen, wherein the display screen is connected to the antenna assembly.

20. A remote controller, comprising:

a housing;

an antenna assembly, accommodated in the housing, wherein the antenna assembly is communicatively connected to an unmanned aerial vehicle;

a main control board, accommodated in the housing, wherein the main control board is connected to the antenna assembly;

a protective cover for a control stick, wherein the protective cover for the control stick is fixed to the housing and partially protrudes from the housing, and comprising:

a first elastic member, wherein a first accommodation groove is provided in a middle of the first elastic member, and the first accommodation groove is configured to mount the control stick;

a second elastic member, arranged around the first elastic member, wherein the second elastic member is fixed to a panel of the remote controller, and a second accommodation groove is provided in a middle of the second elastic member; and a buffer member arranged in the second accommodation groove, wherein the buffer member comprises a first end, a second end and a bent portion located between the first end and the second end, wherein the first end of the buffer member is connected to the first elastic member, and the second end of the buffer member is connected to the second elastic member, and the buffer member is configured to allow the control stick to swing in the second accommodation groove;

the control stick, fixed to the first accommodation groove, wherein the control stick is connected to the main control board; and a display screen, wherein the display screen is connected to the antenna assembly.

* * * * *